United States Patent Office 3,105,838
Patented Oct. 1, 1963

3,105,838
PROCESS FOR MAKING ACRYLIC ACID ESTERS OF 3-HYDROXYMETHYLOXETANES
Leo S. Luskin, Philadelphia, Pa., assignor to Rohm & Haas Company, Philadelphia, Pa., a corporation of Delaware
No Drawing. Filed Nov. 24, 1959, Ser. No. 855,024
4 Claims. (Cl. 260—333)

This invention deals with specific ether esters as new compositions of matter. It further deals with a method for the preparation of these ether esters.

The ether esters of this invention are represented by the formula

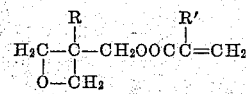

in which R is an alkyl group of one to four carbon atoms, preferably one to two carbon atoms, such as methyl, ethyl, isopropyl, or butyl, and R' is a hydrogen atom or a methyl group.

These ether esters are prepared by reacting a 3-alkyl-3-hydroxymethyloxetane with an alkyl acrylate or methacrylate. It is preferred to use a methyl or ethyl ester of acrylic or methacrylic acid but it is possible to use higher alkyl counterparts, such as butyl, hexyl, octyl, or the like. The yields of product are consistently 85% and better and frequently run to 95% or higher. Somewhat higher yields are obtained when R represents an ethyl group. It is preferred that R represent either a methyl or ethyl group.

The present reaction is conducted in the temperature range of about 60° to 125° C., preferably 80° to 123° C. It is usually advantageous to conduct the reaction at the reflux temperature and remove the alcohol by-product as it is formed. This formed alcohol will generally be removed as an azeotrope with the acrylic or methacrylic reactant which is usually used. It is also desirable in many instances to employ an inert volatile aliphatic solvent, such as cyclohexane, isooctane, or the like. The solvent must be one that forms an azeotrope with the alcohol formed in the reaction. It is also generally preferable to employ 0.1 to 1.0% of a polymerization inhibitor, such as di-para-phenylphenylene-diamine, di-β-naphthol, methyleneanthrone, or the like, in order to maintain the product in a monomeric form.

The present reaction is conducted in the presence of a catalyst having the formula $$M(OR^2)_x$$

in which M is a metal selected from the group of metals of atomic number from 13 to 40 from groups IIIa and IVb of the periodic table, wherein x is a number corresponding to the valance of the metal M and $R^2$ is an alkyl group, preferably of one to five carbon atoms. Typical of the catalysts that may be employed are tetraalkyltitanates, such as tetraethyltitanate, trialkylaluminates, such as triethylaluminate, tetraalkylzirconates, such as tetramethylzirconate, trialkylgallates, such as trimethylgallate. There may also be used alkali metal alkoxides, such as sodium methoxide or potassium ethoxide. Particularly effective are the tetraalkyltitanates, such as tetramethyltitanate, tetraethyltitanate, and tetrabutyltitanate. The catalyst may be employed in amounts of about 0.1 to about 20% or more by weight of the 3-alkyl-3-hydroxymethyloxetane.

The reaction is continued until the theoretical amount of the formed alcohol has been evolved, then the product is distilled and preferably stored with about 0.01% para-methoxyphenol, or the like. The product is obtained in high purity and in good yield, as disclosed hereinbefore.

The present compounds are valuable as solvents for the acrylic polymers and are particularly useful in this respect in paints and other coating applications. The products are monomers that are very active in copolymerizations and are used to form hard transparent insoluble polymers that are useful as paints, coatings, insulation material, structural units, advertising signs, and the like. Particularly useful in this respect are the copolymers formed with other acrylates and methacrylates, such as methyl methacrylate, butyl acrylate, and the like.

The compounds of this invention are readily, safely and satisfactorily handled, distilled and stored, which is surprisingly advantageous in the light of the known unsatisfactory tendencies of somewhat structurally similar compounds. Another unpredictable advantage of the present compounds is that they exhibit no observable contact and inhalation toxicity to warm blooded animals. It has also been observed that the present compounds, their homopolymers or vinyl type copolymers made from them, can be insolubilized by cross-linking with mild acidic agents, such as zinc fluoborate, boron trifluoride etherate, and the like. This characteristic is significant in their usefulness as the vehicle in paints and coatings, which is surprising in the light of the known unsatisfactory properties of somewhat structurally similar compounds. Yet, emulsion polymers made from the compounds of this invention are unusually stable, particularly in the presence of mildly acidic and mildly basic conditions, especially in the presence of organic acids.

The present invention can be more fully understood from the following illustrative examples. Parts by weight are used throughout.

Example 1

A mixture of 3-methyloxetane-3-methanol (204 parts), methyl acrylate (344 parts), tetraisopropyl titanate (6 parts) and diphenyl p-phenylenediamine (3 parts) is heated under a 10-inch column with a magnetic head and Thermowatch (maximum vapor temperature setting 63° C.) using a 30% take-off. In seven hours, the distillation is complete and 61.6 parts (96%) of methanol is obtained. Distillation, using 0.5 part methyleneanthrone as an inhibitor, gives 264 parts (85%) of product, boiling point 51° C. (0.3 mm. absolute pressure) and $n_D^{25}$ 1.4488. The product gives on analysis the following:

Calculated for $C_8H_{12}O_3$: Saponification No. 359.6. Found: Saponification No. 359.

The product is identified as 3-methyloxetane-3-methyl acrylate.

Example 2

A solution of 3-methyloxetane-3-methanol (408 parts), methyl methacrylate (800 parts), and tetraisopropyl titanate (4 parts), to which 4 parts of diphenyl p-phenylenediamine is added, is heated under a 5-inch column and conventional head for 24 hours. Additional catalyst (3 parts) is added after 13 hours. The combined distillates contain 123 parts of methanol or 96% of the calculated amount. Distillation gives 291 parts of recovered methyl methacrylate and 602 parts of the product. The product has a boiling point of 66° C. (1 mm. absolute pressure), and 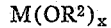 1.4500. The product gives on analysis the following:

Calculated for $C_9H_{14}O_3$: Saponification No. 329.6; oxetane oxygen, 9.4%. Found: Saponification No. 324; oxetane oxygen, 9.5%.

The product is identified as 3-methyloxetane-3-methyl methacrylate.

Example 3

There are added to a reaction vessel 232 parts of 3-ethyloxetane-3-methanol, 344 parts of methyl acrylate, 5 parts of tetraisopropyltitanate, and 3 parts of diphenyl p-phenylenediamine. The reaction system is heated under a 10-inch column with a magnetic head and Thermowatch using a 30% take-off. The heating is continued for 7½ hours after which time 98% of the theoretical methanol is collected. The product is distilled using 0.5 part of methyleneanthrone as an inhibitor to give a yield of 95% of 3-ethyloxetane-3-methyl acrylate. The product has a boiling point of 57° C. at 0.2 mm. absolute pressure and $n_D^{25}$ 1.4531. The product gives on analysis the following:

Calculated for: $C_9H_{14}O_3$: Saponification No. 329.6. Found: Saponification No. 332.

Similar results are obtained by using potassium ethoxytriethylaluminate or tetramethylzirconate as a catalyst.

Example 4

There are added to a reaction vessel 232 parts of 3-methyloxetane-3-methanol, 200 parts of methyl methacrylate, 3 parts of tetraisopropyltitanate, and 4 parts of diphenyl p-phenylenediamine. The reaction mixture is heated under a 5-inch column and a conventional head for 4½ hours during which time the theoretical amount of methanol is collected. The product is distilled at 59° to 61° C. at 0.3 mm. absolute pressure giving an 88% yield of 3-ethyloxetane-3-methyl methacrylate. The product has $n_D^{25}$ 1.4546. The product gives on analysis the following:

Calculated for $C_{10}H_{16}O_3$: Saponification No. 304.5; oxetane oxygen, 8.69%. Found: Saponification No. 305; oxetane oxygen, 8.4%.

A similar result is obtained when ethyl methacrylate or butyl methacrylate is employed in place of methyl methacrylate.

The structures assigned to these novel unsaturated oxetane-containing esters are fully confirmed by their infrared spectra.

I claim:

1. A method for the preparation of a compound having the formula

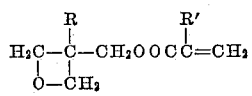

in which R is alkyl of one to four carbon atoms, and R' is a member from the group consisting of hydrogen and methyl, which comprises bringing together and thereby reacting 3-alkyl-3-hydroxymethyloxetane, in which the alkyl group has one to two carbon atoms with a compound having the formula

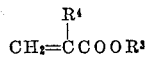

in which $R^3$ is alkyl of one to eight carbon atoms and $R^4$ is a member from the class consisting of hydrogen and methyl in the temperature range of about 60° to 125° C. in the presence of a catalyst having the formula

in which M is a metal selected from the group of metals of atomic number from 13 to 40 from groups IIIa and IVb of the periodic table, x is a number corresponding to the valence of the metal M and $R^2$ is alkyl of one to five carbon atoms.

2. A method according to claim 1 in which the reaction temperature is the reflux temperature of the reaction mixture.

3. A method according to claim 1 in which the reaction is conducted in the presence of a polymerization inhibitor.

4. A method according to claim 1 in which the reaction is conducted in the range of 80° to 120° C. in the presence of a polymerization inhibitor and an inert volatile aliphatic solvent capable of forming an azeotrope with the alcohol formed in the reaction.

References Cited in the file of this patent

UNITED STATES PATENTS

| | | |
|---|---|---|
| 2,229,997 | Claborn | Jan. 28, 1941 |
| 2,322,820 | Brown | June 29, 1943 |
| 2,556,075 | Erickson | June 5, 1951 |
| 2,610,193 | Whetstone | Sept. 9, 1952 |
| 2,910,483 | Schnell et al. | Oct. 26, 1959 |

OTHER REFERENCES

Richter's Organic Chemistry, vol. 3, page 3 (1923), P. Blakiston's Sons & Co.

Fein et al.: JACS, vol. 66, pp. 1201–1203 (1944).

Buess-Thiernagand et al.: Chem. Abs., vol. 47, pp. 11236–11237 (1953).

Reppe et al.: Chem. Abs., vol. 48, p. 11306 (1954).